Patented Jan. 4, 1944

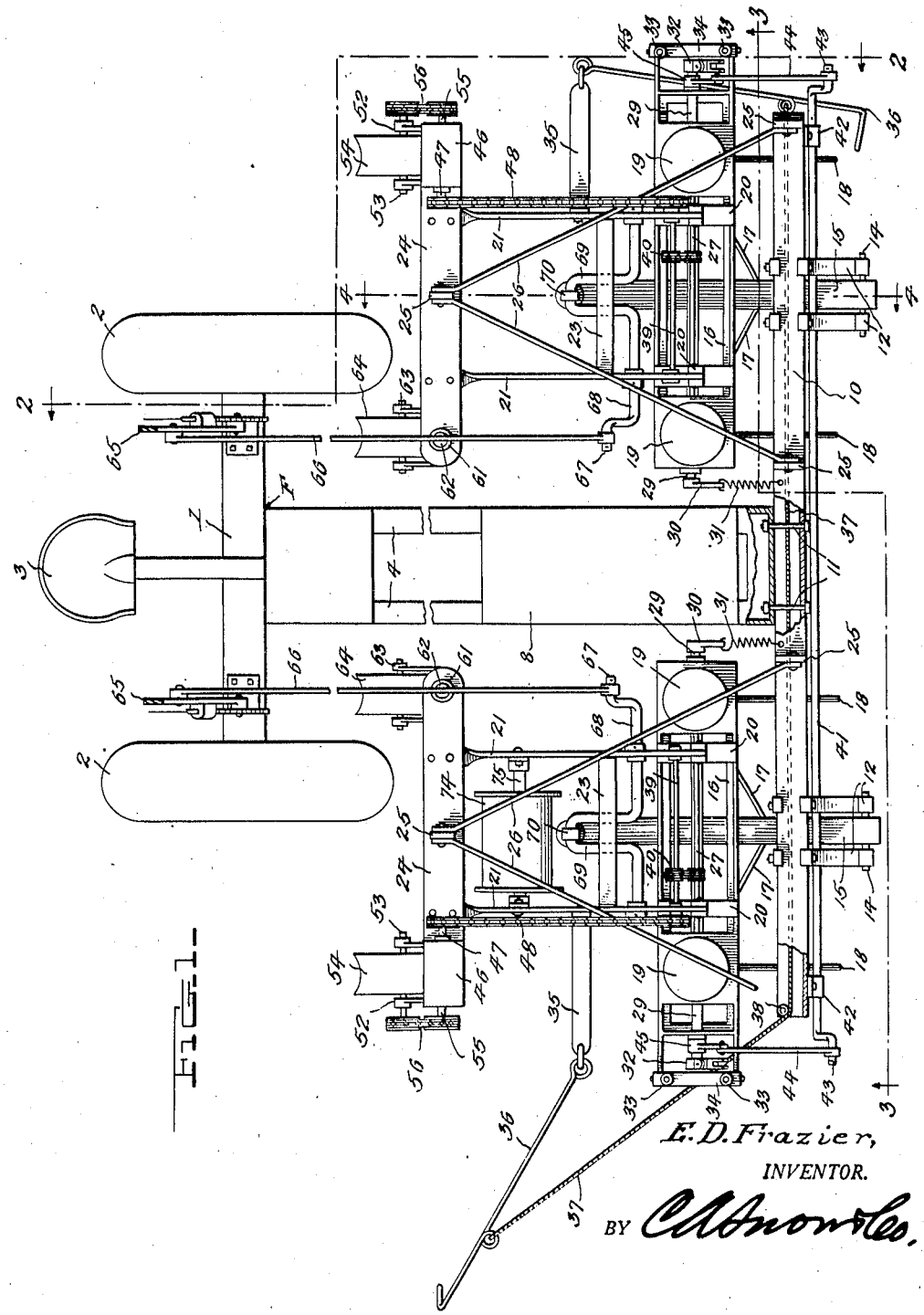

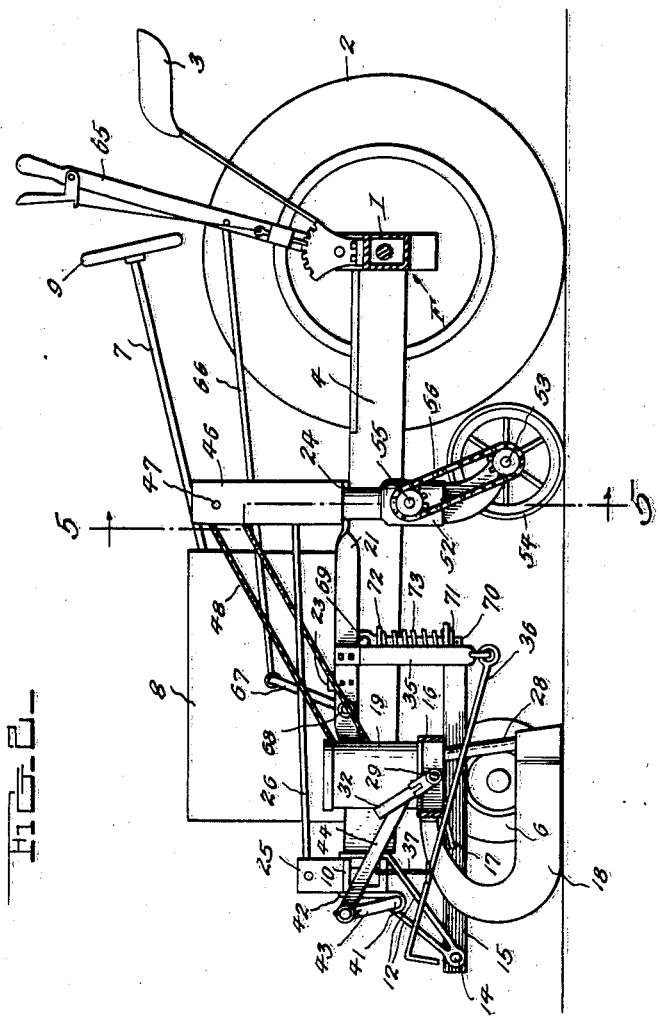

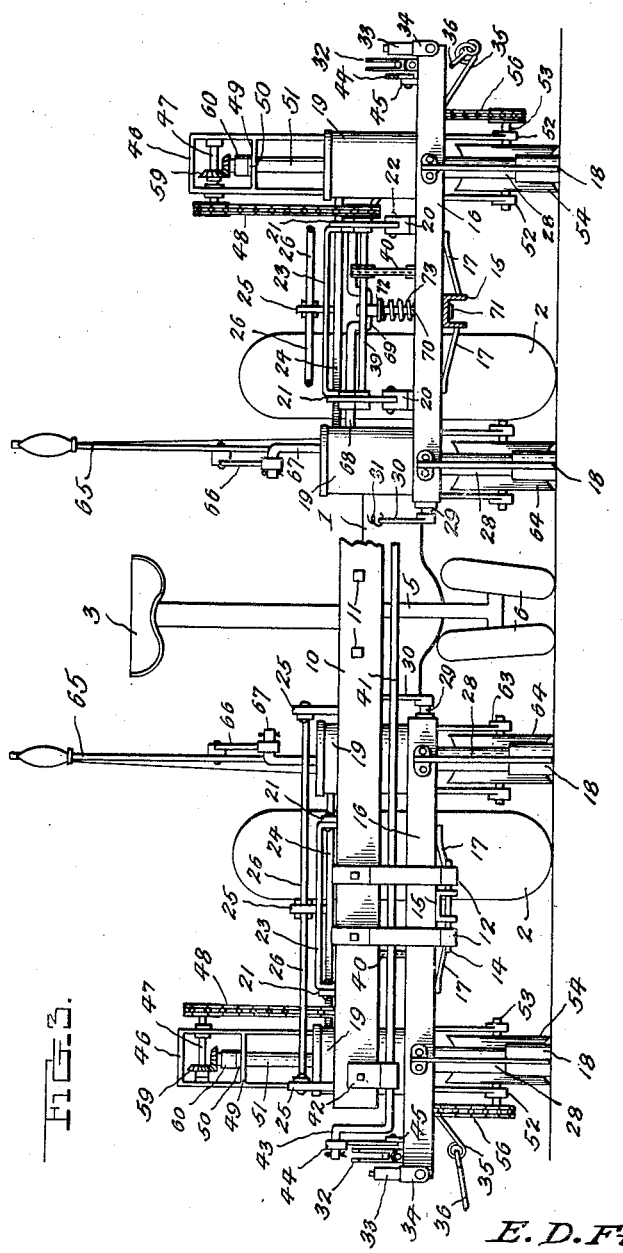

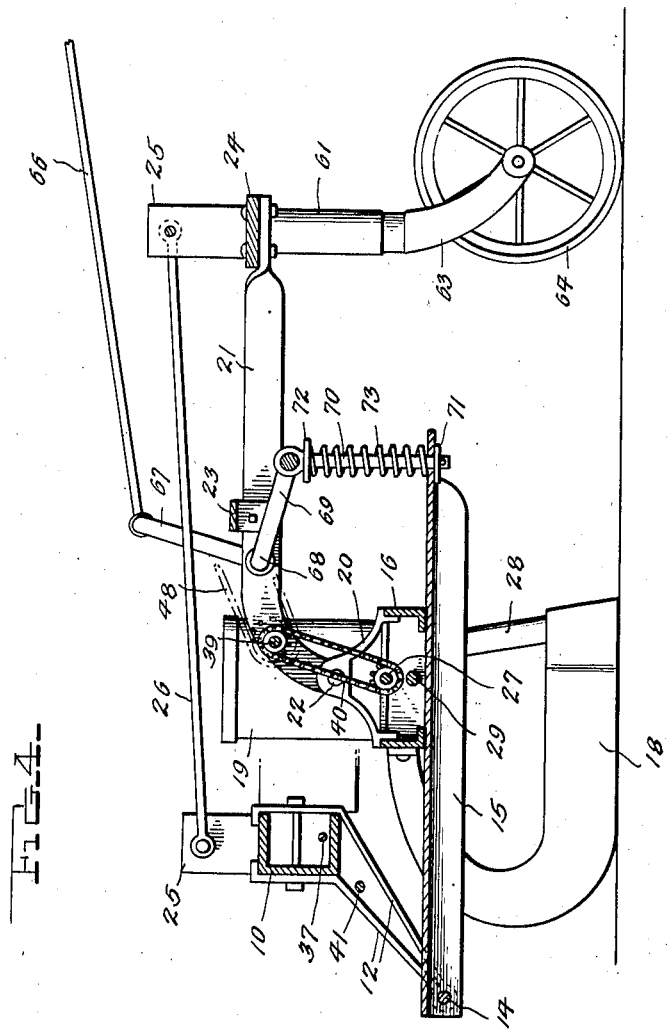

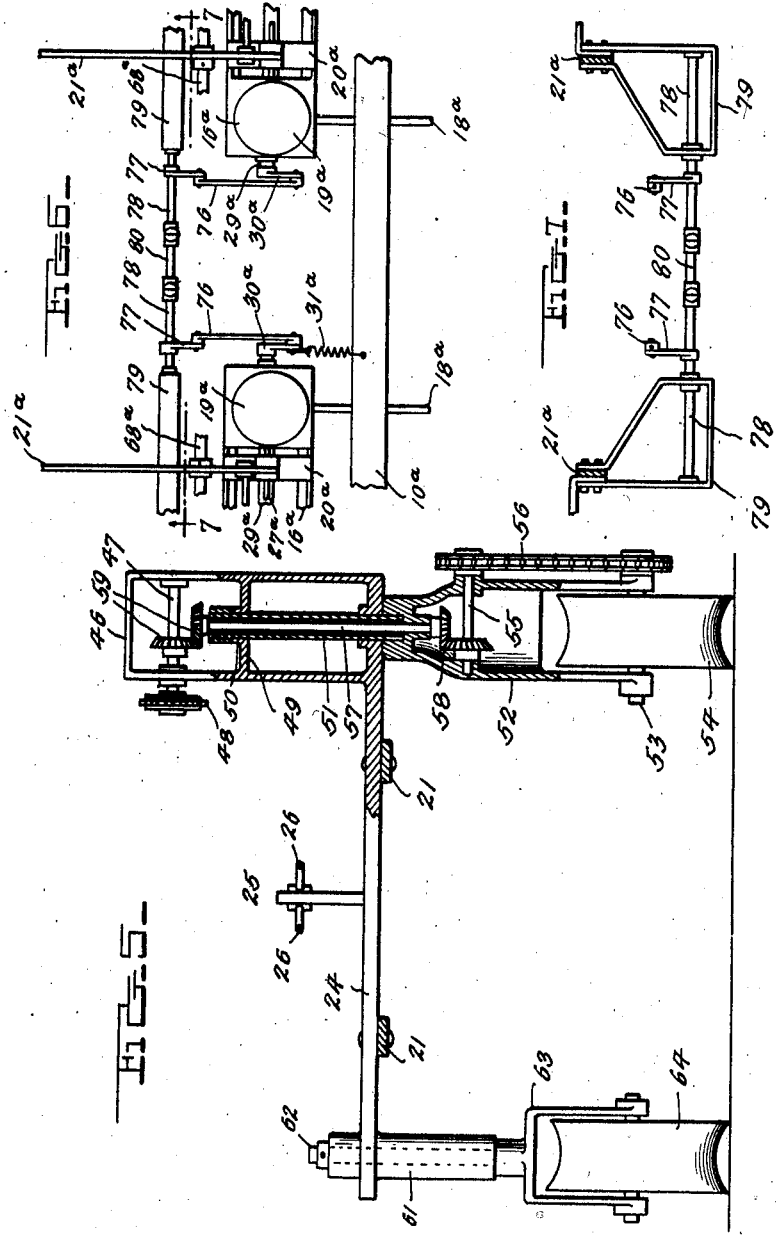

2,338,632

UNITED STATES PATENT OFFICE 2,338,632

CORN PLANTER

Elmer D. Frazier, Galton, Ill.

Application May 12, 1941, Serial No. 393,102

1 Claim. (Cl. 111—59)

The device forming the subject matter of this application is a check row planter embodying, if desired, two duplicate planter units, and the invention aims to provide novel means whereby the checking operation can be carried across from one unit to the other, thereby securing synchronism in the checking operation. Another object of the invention is to provide a planter of the type described, in which the planting mechanism is pushed ahead of a tractor, instead of being hauled behind it, the working parts of the device always being in sight of the operator. A further object of the invention is to supply a device of the class described which can be turned about readily on the ground. A further object of the invention is to supply novel means for mounting and operating the markers. Another object of the invention is to supply novel means for driving the seeder shafts.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in top plan, a machine constructed in accordance with the invention, parts being broken away;

Fig. 2 is a section on the line 2—2 of Fig. 1;

Fig. 3 is a sectional elevation on the line 3—3 of Fig. 1;

Fig. 4 is a section on the line 4—4 of Fig. 1;

Fig. 5 is a section on the line 5—5 of Fig. 2;

Fig. 6 is a top plan showing a modification, parts being broken away;

Fig. 7 is a cross section on the line 7—7 of Fig. 6.

The device forming the subject matter of this application is adapted to be used in connection with tractors of widely different sorts, but, by way of illustration, the drawings show the frame F of a tractor, including a rear axle 1, whereon ground wheels 2 are mounted. The axle 1 carries a seat 3. The frame F of the tractor comprises a forwardly extended body 4. In the forward portion of the body 4, a vertical shaft 5 is mounted to rotate, and steering wheels 6 are journaled on the lower portion of the shaft. The steering of the tractor is effected by a steering mechanism indicated sufficiently by a backwardly extended shaft 7, entering a hood 8 on the body 4 of the tractor frame, a hand wheel 9 being secured to the shaft 7, in accessible relation to a person occupying the seat 3.

The carrier for most of the mechanism hereinafter described is a channel-shaped bar 10, disposed transversely of the line of advance and attached rigidly, intermediate its ends, by securing elements 11, to the forward end of the body 4 of the tractor frame.

The machine comprises planter mechanisms, disposed on opposite sides of the body 4 of the tractor frame, and since these mechanisms are alike, in most respects, the description will proceed in the single number.

A two-part hanger 12 is mounted on the carrier bar 10 and retains a pivot member 14, whereon a rearwardly extended tongue 15 is mounted to swing vertically. A transverse frame 16 is secured intermediate its ends to the tongue 15 and is sustained from the tongue by forwardly extended braces 17. The frame 16 carries openers 18. Feed boxes 19 are mounted on the frame 16 in horizontally spaced relation.

Saddles 20 are mounted on the frame 16, between the seed boxes 19. Upwardly and rearwardly extended radius arms 21 are provided, the forward ends of the radius arms being pivotally mounted at 22 on the saddles 20, for vertical movement. The radius arms 21 are joined together by an intermediate brace 23. A rear cross bar 24 is secured to the radius arms 21, and extends laterally beyond the radius arms, transversely of the draft line. The rear cross bar 24 and the forward bar or carrier 10 are provided with short, upwardly projecting standards 25. Forwardly extended, diverging braces 26 have their rear ends mounted pivotally on the standards 25 of the cross bar 24, the forward ends of the braces being pivotally mounted on the standards of the bar or carrier 10.

A seeder shaft 27 is mounted to rotate in the frame 16 and operates the usual mechanism in the seed boxes 19, the seed passing from the boxes, into the openers 18, by way of tubes 28. A rock shaft 29 is mounted in the frame 16 and governs the flow of seed from the seed boxes 19 in the usual way, responsive to a check-wire (not shown).

At its inner end, the rock shaft 29 has a crank arm 30, connected to the carrier bar 10 by a pull spring 31. A check wire fork 32 is mounted on the outer end of the shaft 29. Check wire spools 33 are mounted at 34 on the outer end of the frame 16, in operative relation to the forks 32.

A transverse shaft 41 is mounted to rock in bearings 42 on the carrier bar 10 and has cranks 43 at its ends. Links 44 are pivoted to the cranks 43 and to crank arms 45 on the check shafts 29 at opposite sides of the machine.

An outwardly extended bracket 35 is mounted on the outermost radius arm 21. A marker 36 is pivotally mounted at its inner end on the bracket 35. The carrier bar 10 is provided with sheaves 38. A flexible member 37 extends through the carrier bar 10, longitudinally thereof, and runs over the sheaves 38. The flexible element 37 is connected to the markers 36 at the opposite sides of the machine, intermediate the ends of the markers.

A countershaft 39 is journaled in the radius arms 21. The countershaft 39 is connected to the seeder shaft 27 by a chain and sprocket drive 40.

On the outer end of the rear cross bar 24 is mounted an upright, loop-shaped frame 46, a horizontal shaft 47 being journaled in the upper portion of the frame. The shaft 47 is connected to the countershaft 39 by a chain and sprocket drive 48. The frame 46 includes an intermediate cross piece 49 (Fig. 5), having an upstanding hub 50. In the hub 50 and in the part 24 is journaled a tubular stem 51, having its lower end secured in a hollow fork 52, disposed beneath the cross bar 24.

In the fork 52, an axle 53 is journaled, a ground wheel 54 being secured to the axle. A horizontal shaft 55 is journaled in the fork 52, and is connected by a chain and sprocket drive 56 to the axle 53. A vertical shaft 57 is journaled in the upper part of the fork 52 and in the hub 50. A collar 60 is secured to the upper end of the stem 51 and engages the hub 50. The shaft 57 is connected to the horizontal shaft 55 by beveled gears 58. Beveled gears 59 form an operative connection between the shaft 57 and the shaft 47.

At its inner end, the cross bar 24 has a vertical tubular bearing 61, in which is journaled the stem 62 of a fork 63 wherein is supported a ground wheel 64, having a concaved tread. The ground wheel 64 is disposed opposite to the ground wheel 54, transversely of the machine.

A latch controlled hand lever 65 is fulcrumed on the tractor axle 1, the rear end of a connecting rod 66 being pivotally mounted upon the lever. The forward end of the connecting rod 66 is pivoted to a crank 67 on the inner end of a transverse shaft 68, which is mounted to rock in the radius arms 21. The shaft 68 is provided with an intermediate crank 69, the upper end of a connecting rod 70 being pivoted to the crank 69. The lower portion of the connecting rod 70 is vertically slidably in the rear end of the tongue 15. The connecting rod 70 is supplied at its lower end with a stop 71, engaged beneath the tongue 15, as shown in Fig. 4. Near its upper end, the connecting rod 70 is supplied with an abutment 72. A compression spring 73, acting as a cushioning spring, surrounds the rod 70 and is engaged at its upper end with the abutment 72, the lower end of the spring being engaged with the rear part of the tongue 15.

In the radius arms 21 of one of the planter units, a drum 74 is supported for rotation as indicated at 75 in Fig. 1. The drum 74 is employed to carry the check wire (not shown) when the wire is not in use.

In practical operation, the openers 18 are raised and lowered by a train of parts including the tongue 15, the connecting rod 70, the crank 69, the shaft 68, the crank 67, the connecting rod 66, and the hand lever 65.

Referring to Fig. 5, the seeder shafts 27 are operated by parts including the ground wheel 54, the axle 53, the chain and sprocket drive 56, the shaft 55, the beveled gears 58, the shaft 57, the beveled gears 59, the shaft 47, the chain and sprocket drive 48, the countershaft 39 of Fig. 1, and the chain and sprocket drive 40.

The shaft 29 at one end of the frame 16 is actuated by the engagement between the check wire (not shown) and the corresponding fork 32. The crank arm 45, the link 44, the crank 43 and the shaft 41 transmit movement from the unit at one side of the machine, to the unit at the opposite side of the machine, in a way which will be understood readily when Fig. 1 of the drawings is noted. As to checking, therefore, the two units operate in synchronism.

The markers 26 function, one at a time, to make a mark across the field, the mark being followed at the next crossing of the field. The markers 36 require little or no attention and are practically automatic in operation. As the machine is turned, to begin a new row, the marker at the left hand side of Fig. 1 swings forwardly, the flexible element 37 is slacked away, and the marker 36 at the right hand side of Fig. 1 attains a hold on the ground and maintains the left hand marker in the inoperative position occupied in Fig. 1 by the right hand marker.

The device may be assembled readily with a tractor, by coupling a carrier bar 10 to the forward end of the body 4 of the tractor frame, by way of the securing elements 11, the connecting rods 66 being coupled to the hand levers 65. The braces 26 connect the seedling unit to the carrier bar 10, and prevent side sway.

It is to be noted that the planting mechanism is carried by the bar 10 which is located at the forward end of the tractor frame. The machine is pushed ahead of the tractor, rather than pulled behind it, and the mechanism always is in front of the operator and in his field of view. The wheels 54, 64 and 6 operate independently of one another, and the machine can be caused to make a square turn, or a complete reversal of direction of movement, within a small area. The wheel 64 is an idle wheel, and has no function as an operating means, the drive being derived from the wheel 54.

Referring to the modification shown in Figs. 6 and 7, the shaft 41 of Fig. 1 is omitted, together with associated parts. Members hereinbefore described have been designated by numerals already used, with the suffix "a."

To the crank arms 36a of the two cultivator units are pivoted backwardly extended links 76, the rear ends of the links being pivoted to crank arms 77 on shaft sections 78, which are mounted to turn in hangers 79 carried by the radius arms 21a. The inner ends of the shaft sections 78 have longitudinal sliding movement in a universal joint structure 80, but cannot rotate independently of that structure.

The construction is such that the checking operation can be carried across from one unit to the other, the modification being of use, especially, when the nature of the ground is such that the two cultivator units do not operate at the same level, or if the distance between the planter units is greater or less than standard.

The tongues 15, the frame 16, and associated parts, form trailing trucks, assembled with the carrier bar and supporting the planting mechanisms.

Having thus described the invention, what is claimed is:

An agricultural machine comprising an elongated carrier, means for securing the carrier intermediate its ends to the forward portion of a tractor, rearwardly extended tongues located on opposite sides of said means and having their forward ends pivotally assembled with the carrier for vertical movement, a transverse frame secured intermediate its ends to the intermediate portion of each tongue, a pair of rearwardly-extended radius arms for each frame, a rear cross member secured to the radius arms of each pair, the radius arms and the rear cross members forming parts of trailing trucks, a ground wheel carried by each truck, a pair of check-wire-actuated seeding devices on each frame, a shaft forming an operative connection between the seeding devices of each pair, mechanisms for actuating the shafts from the ground wheels of the respective trucks, said mechanisms each comprising chain and sprocket connections, means for obviating lateral movement of the trucks with respect to the frames, thereby to prevent disengagement of the chains from the sprocket wheels, the last-specified means comprising pivot parts connecting the forward ends of the radius arms with the respective frames for vertical swinging movement and pairs of rearwardly diverging braces, the braces of each pair having their forward ends connected to the carrier at transversely spaced places, the rear ends of the braces of each pair being connected to the cross member of one truck at a common point, and means for supporting the rear end of each tongue.

ELMER D. FRAZIER.